US006947910B2

(12) United States Patent
Hsu et al.

(10) Patent No.: US 6,947,910 B2
(45) Date of Patent: Sep. 20, 2005

(54) SECURE TICKETING

(75) Inventors: Michael M. Hsu, San Jose, CA (US); Dennis J. McMahon, Tracy, CA (US)

(73) Assignee: E-Cast, Inc., San Francisco, CA (US)

( * ) Notice: Subject to any disclaimer, the term of this patent is extended or adjusted under 35 U.S.C. 154(b) by 643 days.

(21) Appl. No.: 09/974,931

(22) Filed: Oct. 9, 2001

(65) Prior Publication Data

US 2003/0069904 A1 Apr. 10, 2003

(51) Int. Cl.[7] .................................................. H04L 9/00
(52) U.S. Cl. ........................................... 705/57; 709/59
(58) Field of Search ............................. 705/51, 54, 57, 705/59; 713/156, 176, 190; 380/201

(56) References Cited

U.S. PATENT DOCUMENTS

| | | | | |
|---|---|---|---|---|
| 4,433,207 A | * | 2/1984 | Best | 713/190 |
| 5,034,980 A | * | 7/1991 | Kubota | 705/57 |
| 5,629,980 A | | 5/1997 | Stefik et al. | |
| 6,002,772 A | | 12/1999 | Saito | |
| 6,226,618 B1 | | 5/2001 | Downs et al. | |
| 6,236,971 B1 | * | 5/2001 | Stefik et al. | 705/54 |
| 6,314,518 B1 | * | 11/2001 | Linnartz | 713/176 |
| 6,367,019 B1 | | 4/2002 | Ansell et al. | |
| 6,389,403 B1 | | 5/2002 | Dorak, Jr. | |
| 6,397,333 B1 | * | 5/2002 | Sohne et al. | 705/57 |
| 6,398,245 B1 | | 6/2002 | Gruse et al. | |
| 6,418,421 B1 | | 7/2002 | Hurtado et al. | |
| 6,473,560 B1 | * | 10/2002 | Linnartz et al. | 380/201 |
| 6,513,117 B2 | * | 1/2003 | Tarpenning et al. | 713/156 |
| 6,530,021 B1 | * | 3/2003 | Epstein et al. | 713/176 |
| 6,567,916 B1 | * | 5/2003 | Terao et al. | 713/176 |
| 6,574,609 B1 | | 6/2003 | Downs et al. | |
| 6,587,837 B1 | | 7/2003 | Spagna et al. | |
| 6,587,842 B1 | * | 7/2003 | Watts | 705/57 |
| 6,601,046 B1 | * | 7/2003 | Epstein | 705/57 |
| 6,697,948 B1 | | 2/2004 | Rabin et al. | |
| 6,714,921 B2 | | 3/2004 | Pirolli et al. | |

FOREIGN PATENT DOCUMENTS

FR 2701181 * 8/1994 ............ H04M/3/42

OTHER PUBLICATIONS

NNRD41894, "RMTP Ticket Issue System", Reasearch Disclosure, (Feb. 1999)(UK) vol. 42, #418.*

* cited by examiner

*Primary Examiner*—Salvatore Cangialosi
(74) *Attorney, Agent, or Firm*—MacPherson Kwok Chen & Heid LLP

(57) ABSTRACT

Methods, apparatus and system, including computer program products, implementing and using techniques for generating a ticket representing a selection of media files to be transferred from a content server to a playback device. A selection of one or more media files to be transferred to a particular playback device is received. Device identifying information for the particular playback device is received. A ticket based on the device identifying information is generated. The ticket is redeemable for the selected media files and the media files are formatted so that they can only be rendered on the particular playback device. Methods, apparatus and system, including computer program products, implementing and using techniques for redeeming a ticket representing a selection of media files to be transferred from a content server to a particular playback device are also described.

26 Claims, 3 Drawing Sheets

SECURE TICKETING

BACKGROUND

This invention relates to downloading of media files through a communications network.

Music and other types of audio recordings are conventionally sold to consumers through stores or mail-order companies. When music or audio recordings are sold through these types of outlets, the recordings are usually distributed on tangible media, such as compact discs, magnetic cassette tapes, digital tapes, and so on. Another, alternative way of distributing music is to receive orders and distribute music electronically over a communications network, such as the Internet. A person can connect to a music provider and download music over the Internet, either for free or for a fee. A few examples of providers that make digital audio files available of downloading are RealNetworks Inc., Audible Inc., MP3.com Inc. and Emusic.com Inc.

The downloaded music can be played back with appropriate audio playback software on the user's computer, either while the computer is connected to the Internet (that is, through streaming playback of the audio data), or at later time. Examples of common software for playback audio files include the RealPlayer and the Windows MediaPlayer software. The user can organize his or her downloaded audio files into a personal jukebox on his or her computer. The user can also optionally transfer the downloaded audio files from his or her computer to a portable player that can play back audio files, so that he or she can leave his or her computer and still be able to listen to the previously downloaded audio files.

In many cases, the audio files are not stored at the server that hosts the shopping site from which the user buys the audio files. The site from which the user buys the audio files then typically issues a ticket and delivers the ticket to the user. The ticket serves as a proof of purchase and can be redeemed by the user at a different server, where the content is stored. When the user provides the ticket to the content server, the content server verifies the ticket to make sure that the ticket is genuine and delivers the corresponding content to the user's computer or playback device. This process can either be manual, that is, initiated by the user, or automatic. One example of a system that works according to this principle is the "proof of purchase" concept, provided by Intertrust Inc.

An alternative method is used in the EMMS system provided by International Business Machines Inc. (IBM). In this system, when a user buys audio content, he or she obtains a token. A corresponding, second token is also issued and sent to the content store. When the user wishes to redeem his token at the content store, the content store matches the user's token with the second token that was already sent to the content store by the electronic store where the user bought the audio files. If the two tokens match, the audio files are delivered to the user.

A problem with the EMMS and the "proof of purchase" concepts is that there is no way for the content store to verify that the user who redeems the ticket is the rightful owner of the ticket. If a ticket is intercepted on the way from the vendor to the user, the person who intercepts the ticket can redeem the ticket and obtain the content, and the content provider has no way of knowing that the content is not delivered to the rightful owner of the ticket.

SUMMARY

In general, in one aspect, this invention provides methods, apparatus, and systems, including computer program products, implementing and using techniques for generating a ticket representing a selection of media files to be transferred from a content server to a playback device. A selection of one or more media files to be transferred to a particular playback device is received. Device identifying information for the particular playback device is received. A ticket is generated based on the device identifying information. The ticket is redeemable for the one or more selected media files and the media files are formatted so that they can only be rendered on the particular playback device.

Advantageous implementations can include one or more of the following features. The ticket can be transferred to a delivery agent that is operable to communicate with the particular playback device. The delivery agent can reside in the particular playback device. The delivery agent can reside on hardware platform and the particular playback device can be intermittently connected to the hardware platform. The device identifying information can be obtained from a removable nonvolatile storage medium in the particular playback device. The device identifying information can include a unique identification string obtained from the particular playback device. The unique identification string can be a serial number. The device identifying information can be a dynamically generated identification string. The string can be generated by a secure number generator in the particular playback device.

Generating a ticket can include storing a transaction identification number as a key to a record containing identifiers for the one or more selected media files. Generating a ticket can include generating a ticket representing a download URL to the content server, wherein the download URL contains device identifying information. Generating a ticket can include generating a secure hash of the transaction identification number.

In general, in one aspect, this invention provides methods, apparatus, and systems, including computer program products, implementing and using techniques for redeeming a ticket representing a selection of media files to be transferred from a content server to a playback device. A ticket redeemable for one or more media files is received. The ticket includes device identifying information for a particular playback device to which the media files are to be transferred. Device identifying information is received from the particular playback device to which the media files are to be transferred. The ticket is validated using the device identifying information included in the ticket and the device identifying information from the particular playback device. The one or more selected media files are formatted for the particular playback device if the ticket is valid. The one or more formatted media files are transferred from the content server to the particular playback device.

Advantageous implementations can include one or more of the following features. A content license can be created for the one or more selected media files. The content license can contain information about what operations can be performed on the one or more media files after the one or more media files have been transferred to the particular playback device. The content license can be transferred from the content server to the particular playback device. Transferring the one or more formatted media files can include transferring the one or more formatted media files to a delivery agent that is operable to communicate with the particular playback device. The delivery agent can reside in the particular playback device. The delivery agent can reside on a hardware platform and the particular playback device can be intermittently connected to the hardware platform.

The ticket can include a transaction identification number and validating the ticket can include verifying that a transaction identification number that corresponds to the transaction identification number contained in the ticket exists on the content server. The ticket can include a download URL and a secure hash value and validating the ticket can include generating a secure hash value for the download URL and comparing the secure hash with the secure hash included in the ticket. Validating the ticket can include determining if the one or more media files already have been successfully retrieved. Validating the ticket can include verifying that the particular playback device associated with the ticket also is associated with a user account at a service provider site from which the ticket was issued.

The invention can be implemented to realize one or more of the following advantages. A ticket can be issued that is good for one particular playback device only. Thereby, even if the ticket stolen and the person who stole the ticket manages to redeem the content from the content server, that person cannot render the obtained content, unless he or she also has the playback device for which the ticket was issued. Consequently, there is no reason to steal a ticket from the rightful owner. Digital music will always be delivered to the rightful owner.

The details of one or more implementations of the invention are set forth in the accompanying drawings and the description below. Other features, objects, and advantages of the invention will be apparent from the description and drawings, and from the claims.

DETAILED DESCRIPTION OF THE DRAWINGS

Like reference symbols in the various drawings indicate like elements. Like reference symbols in the various drawings indicate like elements.

DETAILED DESCRIPTION

Figure 1:
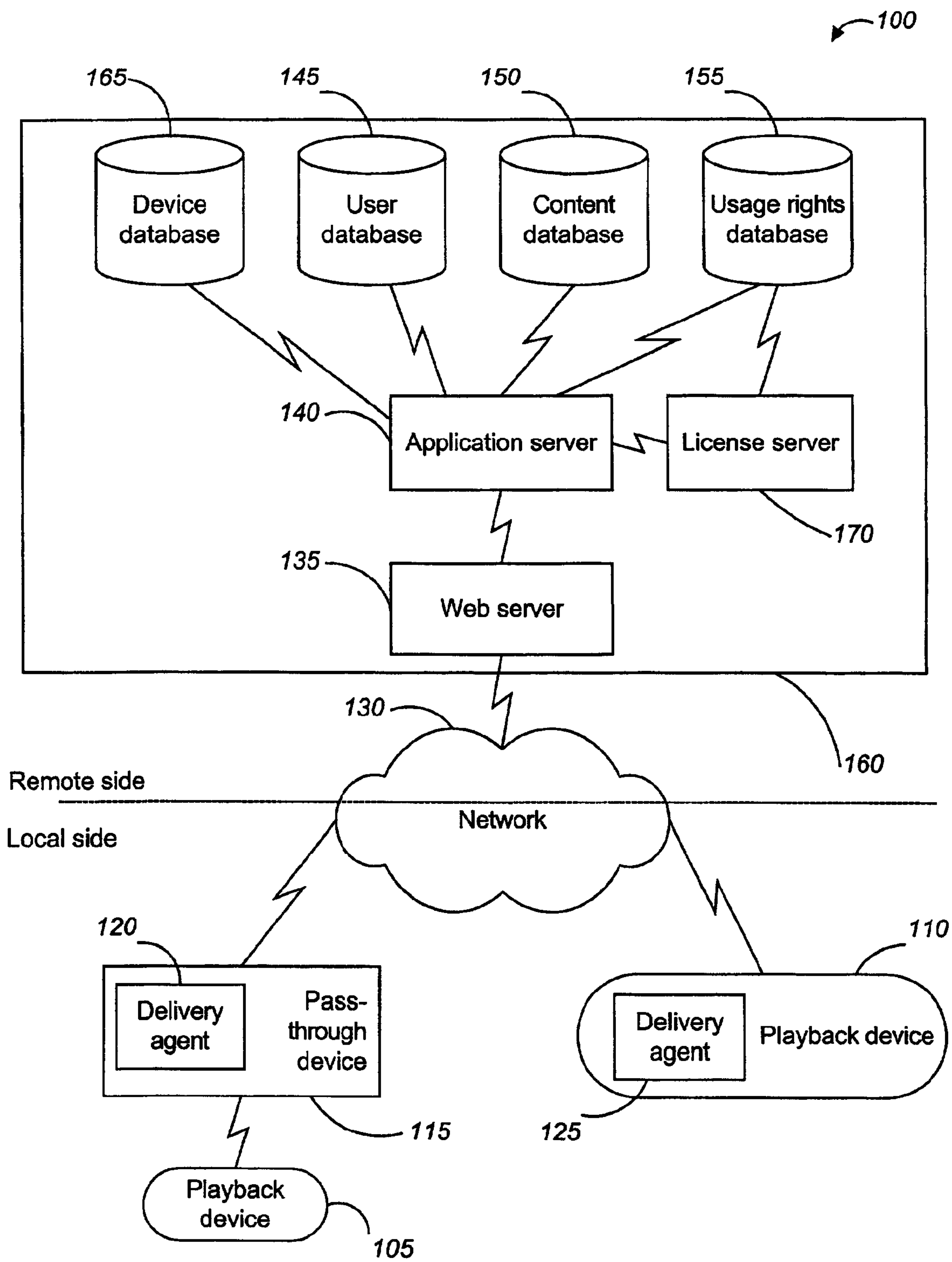
FIG. 1 is a schematic diagram showing a delivery system for audio content in which secure ticketing in accordance with the invention can be applied.

The invention will be described below by way of example of audio files and a digital audio playback device. A schematic view of a system in which the secure ticketing in accordance with invention can be applied is shown in FIG. 1. A similar system, in which the invention also can be applied, can be found in commonly-owned U.S. patent application with Ser. No. 09/894,846, filed Jun. 27, 2001, which is hereby incorporated by reference in its entirety. As shown in FIG. 1, a system (100) for delivery of audio files to a particular device has a local side and a remote side. The concepts local side and remote side of the system are used here from a system user's (that is, consumer's) point of view.

In one implementation of the system, the remote side includes a content server (160) that interacts with the users' playback devices during a delivery of audio files to the users' audio playback devices. The content server (160) includes a web server (135), an application server (140), a user database (145), a content database (150), a device database (165), and a license server (170) with an associated user rights database (155). The different components of the content server can be integrated into one or several physical units, depending on the needs of the service provider, and the boxes can be connected with conventional communication links. The devices that the local side of the system include devices that belong to the users, such as a digital audio playback device (105,110) and optionally a pass-through device (115), such as a computer or set-top box to which the user can connect an audio playback device.

Many other system configurations are possible, as will be clear from the following description. Furthermore, throughout the specification reference will be made to audio files or to digital audio files. Audio in this context refers to any audible content, tone, or sound, regardless of how the audio has been generated. Audio can include, for example, music, songs, tunes, tracks, titles, voice, speech and other content similar or analogous to content that can be provided by broadcast radio station.

At the remote side of the system, the web server (135) is the part of the content server (160) that is used to provide a user interface between the users that are connected to the communications network (130) and the application server (140), which is the central part of the content server. The web server typically hosts web pages that are associated with a user interface and service for selecting audio files to download to the computer or playback device and web pages that are associated with the management of the personal user account. A user can view the web pages either in a web browser on his/her computer, or on a display on a playback device, such as home stereo or a personal digital assistant (PDA), for example. The user can either purchase the audio files for unlimited playback on his or her playback device, or rent the audio files for a time-limited period or a limited number of playbacks.

The web server (135) communicates with the application server (140). The application server (140) does not allow any direct user interaction. Any commands the user wishes to send to the application server have to go through a delivery agent on the local side of the system and/or a web browser that is in communication with the web server on the remote side of the system. The delivery agent will be described in further detail below. The application server acts as a coordinator for the content server (160) and can communicate with delivery agents (120,125) on the local side of the system, the web server (135), the user database (145), the content database (150), the device database (165) and the license server (170) with its associated usage rights database (155) on the remote side of the system.

The user database (145) contains information about the users and information relating to their digital media playback devices, in particular what devices are associated with what user. The content database (150) is a database in which audio files and associated metadata are stored. The device database (165) contains information about different types of audio playback devices and their capabilities of playing back different types of audio files. The usage rights database (155) contains usage rights for the audio content in the content database. The license server (170) receives requests for licenses from the application server (140) and issues licenses in response to the requests, based on information in its associated usage rights database (155).

On the local side of the delivery system, a delivery agent (120, 125) is designed to communicate with the application server (140). The delivery agent can be located in the playback device itself, or in another device, such as a computer. The delivery agent contains the functionality required for communicating with a remote server and for forwarding tickets, receiving audio files (or other media files, as the case can be). Optionally, the delivery agent can contain functionality for providing status reports to the user and to the content server about the progress of the transfer process of the files between the content server and the playback device. One example of a delivery agent, which can perform the above and additional functions, is a download manager. The download manager has been extensively described in U.S. patent application Ser. No. 09/894,846. The download manager contains a web browser interface, inside which a browser specific core and a common core reside. The common core offers a common set of services (that is, properties and methods) that can be used by the browser specific components. The common core also forms an interface to a media device manager (MDM) and a digital rights manager (DRM) that can be residing on the playback device or the pass-through device.

A process for issuing a secure ticket will now be described. It is assumed that a delivery agent for a playback device is temporarily connected to the communications network and that a user and the delivery agent for the playback device have been identified to the content server. The user who issues the request for having the files transferred to his or her playback device can also have registered himself or herself and the playback device, or have connected the playback device to the network, so that the corresponding user information and device information exist in the user database and device database, respectively.

Furthermore, in the implementation of the invention that will now be described, the application server is implemented in an ATG Dynamo application server framework. The ATG Dynamo application server is a Java-based (J2EE compliant) application server. It should, however, be noted that many other types of application servers would work equally well, such as non-HTTP-based servers. In the present implementation, the Dynamo server hosts Dynamo JHTML pages, which contain <droplet> tags. Each droplet references a Dynamo component. Associated with each Dynamo component are properties (accessible through get( ) and set( ) Java methods) and a Java class. The Java class typically contains a service( ) method that processes the HTTP request parameters and outputs the result to the HTTP client (in this case, the delivery agent at the local side of the system).

Figure 2:
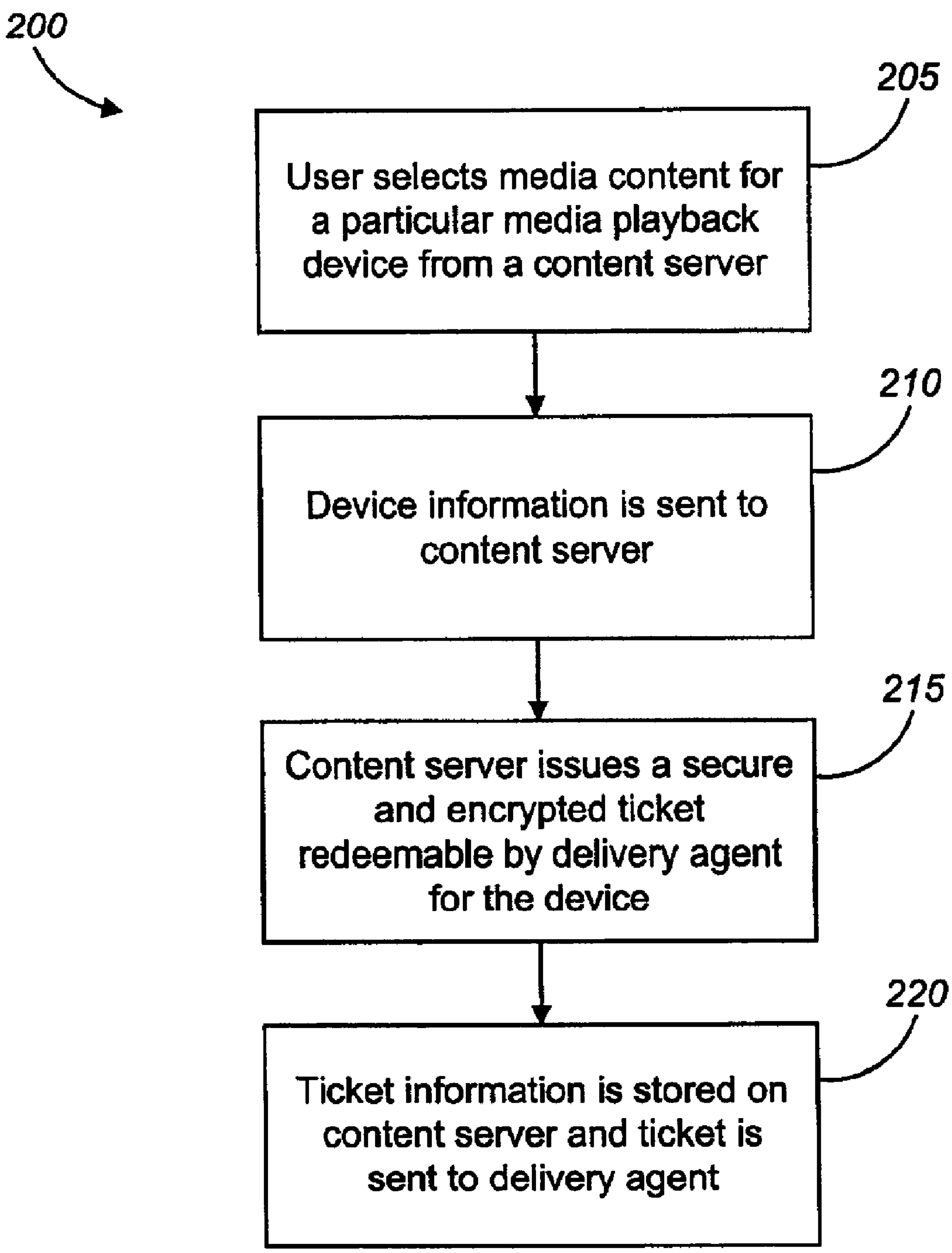
FIG. 2 is a flowchart showing a process for issuing a secure ticket in accordance with invention.

FIG. 2 shows an exemplary process (200) for issuing a secure ticket for a particular playback device in accordance with invention. It starts with a user selecting one or more audio files (step 205) from an electronic shopping site or a subscription service provider hosting a web server (135). The user typically has account registered with the service provider and can select the files using any conventional method, such as an electronic shopping cart. The account is associated with certain rights controlling what access the user has to various files prior to transferring the files to his or her delivery agent and what operations he or she can perform on the files after the files have been transferred to the delivery agent. In addition to the rights associated with the user account, there are rights associated with the content that the user selects to transfer to the delivery agent. The web server (135) hosting the site from which the user selects audio files to be downloaded is in communication with the application server (140). The application server (140) can be hosted at the same site or at a totally different site.

When the user has selected the content that he or she would like to transfer to his or her playback device, the content server checks whether the ticket should be issued for a particular device (or delivery agent) only, or for any device (or delivery agent) that attempts to redeem the ticket. This typically depends on usage rules that are associated with the content that the user tries to get delivered to his or her playback device. If the user, for example, chooses promotional content that has no usage restrictions, a generic ticket will be issued, but if a user buys or rents content that is only allowed to be transferred to a particular device or a particular kind of device, a device specific ticket will be issued. If a device specific ticket is to be issued, device identification information is sent to the content server (step 210). The device identification information can either be sent from a delivery agent (120,125) residing on the user's playback device (105) or on his or her pass-through device (115), or alternatively be sent from the user database (145) if it has been previously stored there. The user can, for example, have registered one or more playback devices in the user database (145) and select what playback device the content is intended for. The playback device itself may or may not be present at the time of purchase of the audio files. If the content only requires a generic ticket, no device identification needs to be sent to the content server.

The content server issues a ticket as a downloadURL with embedded tags, representing a URL to a site where the user can redeem the ticket. The ticket has the following format: http://d2ddemo.home.rioport.com/ContentDelivery/html/WMADirectToDevice.jhtml?TICKET=123456MNOPQRSTUVWX&PDVID=%pdvid%&PDMFR=%pdmfr%&PDMDL=%pdmdl%&PDVER=%pdver%&PDSN=%pdsn%

The first part of the TICKET value, 123456, represents a transaction ID. The second part of the ticket, that is, letters MNOPQRSTUVWX, represents a secure hash value of the transaction ID. The substrings %pdvid%, %pdmfr%, %/opdmdl%, %pdver%, and %pdsn% represent placeholders for the device ID, device manufacturer, device model, device version, and device serial number, respectively. In a different implementation, a subset of this information can be used, depending on what degree of identification of the playback device is required by the service provider for different audio files.

If the user has chosen to obtain a device specific ticket, the substrings %pdvid%, %pdmfr%, %pdmdl%, %/opdver%, and %pdsn% in the downloadURL are substituted at the content server with the device identification information that was sent to the content server by the playback device, or that was obtained from a database. The downloadURL will then look similar to:

http://d2ddemo.home.rioport.com/ContentDelivery/html/WMADirectToDevice.jhtml ?TICKET=123456MNOPQRSTUVWX&PDVID=00000112&PDMFR=Compam,%20Samsung.%20Eiger&PDMDL=Compaq%20PA-1%20Player&PDVER=01000400&PDSN=00000253444D422D3332210D1C0423EB.

A copy of the transaction ID is stored on the content server, or at any other secure location that can be accessed by the content server, as a key to a Dynamo Repository record. The Dynamo repository record contains information about the particular device, if any, for which the ticket was issued, as well as what content is associated with the ticket. The downloadURL is embedded into an ASX file, which is sent to the delivery agent for the particular playback device (step 220). When the delivery agent (120) receives the ASX file from the content server, the delivery agent substitutes the substrings %pdvid%, %pdmfr%, %pdmdl%, %pdver%, and %pdsn% in the downloadURL with values for the playback device to which the audio files are to be delivered, if the downloadURL does not already contain these values. After the values have been inserted, the downloadURL looks similar to:

http://d2ddemo.home.rioport.com/ContentDelivery/html/WMADirectToDevice.jhtml ?TICKET=

123456MNOPQRSTUVWX&PDVID=00000112&PDMFR=Compaq,%20Samsung,%20Eiger&PDMDL=Compaq%20PA-1%20Player&PDVER=01000400&PDSN=00000253444D422D3332210D1C0423EB The user is now in possession of the ticket, which is secure since it is only redeemable for the playback device (105, 110) for which the user purchased the audio files.

In another implementation, the playback device or the associated delivery agent generates a unique identifier dynamically, such as a string or a number, for the playback device to which the audio files are to be downloaded. The unique identifier is sent to the content server as a device identifier and a copy is stored on the playback device or in the associated delivery agent to be used as a unique device identifier when the ticket is redeemed. The unique identifier can for example be generated using a secure number generator or digital rights management system (DRM) in the device or in the delivery agent.

The redeeming of the ticket at the content server (160) can take place immediately after the content has been purchased, or at a later time, and can either be initiated by user or be initiated automatically by software residing on the playback device.

Figure 3:
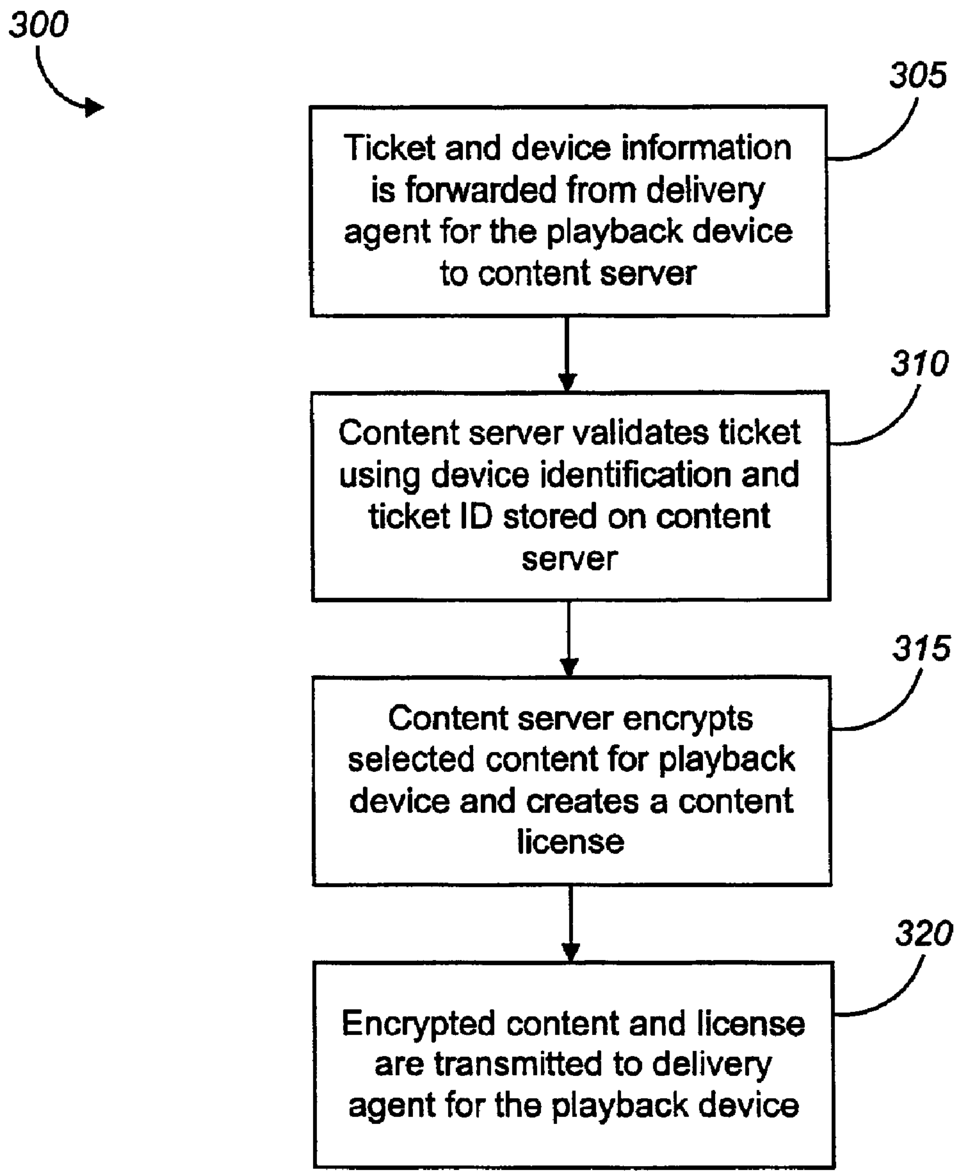
FIG. 3 is a flowchart showing a redeeming process for a secure ticket in accordance with invention.

FIG. 3 shows a redeeming process (300). The playback device may or may not be present, that is, connected to the network, when the ticket is redeemed. The delivery agent is the only component that is needed for redeeming the ticket at the content server. If the delivery agent is not located in the playback device and the associated playback device is not present, the audio files are temporarily stored at a temporary location when they are received by the delivery agent. The audio files must then be transferred to the playback device at some later point. When a secure ticket is to be redeemed, the ticket and device identification is forwarded from the delivery agent to the content server (step 305). The forwarding of the ticket and device identification is performed by doing a HTTP get( ) method for the above substituted downloadURL to invoke the Dynamo servlet.

Next, the content server validates the ticket (step 310). The content server uses the transaction ID that is embedded in the download URL to calculate a hash value. The calculated hash value is then compared with the hash value in the downloadURL sent to the content server by the delivery agent. If the two hash codes mismatch, a security alert is generated. If the hash codes match, this means that the ticket is a potentially valid ticket. By first checking the hash value for a ticket, so called "denial of service attacks" can be avoided, which would occur if someone tried to flood the content server with false tickets. Without the hash check, the server would try to find a matching ticket for every false ticket and not being able to adequately serve honest requests. Furthermore, by hashing the transaction ID, attacks can also be prevented in which a person tries to "steal" a particular audio file by completing all of the other parameters for their device and the audio file and then randomly inserting transaction ID numbers into that data and sending the ticket hoping to find a correct combination of transaction ID, content and finding a repository record that contains no device identifier. The hash check takes place no matter if the ticket is a generic ticket or if the ticket is a specific ticket for a certain playback device.

If the hash test passes, the stored transaction ID is used as a key to look up the Dynamo repository record of the purchased audio files. If the transaction ID is invalid, a security alert is generated. The process then checks if the repository record contains parameter values for the device ID, device manufacturer, device model, device version and device serial number (or the appropriate subset of these parameters, as discussed above). If there are no parameter values in the repository record, this means that the ticket is a generic ticket that can be redeemed for any device. The ticket is thus considered to be a valid ticket and the values are filled in with the values specified in the downloadURL. If the repository record contains parameter values, the content server checks the parameter values in the repository record against the ones supplied by the delivery agent in the downloadURL. If the values are the same, it means that the ticket was issued for the particular device that is trying to redeem the ticket and that the ticket is valid. Alternatively, it can mean that a retry is being carried out, for example, if the a previous redeeming process had been interrupted. In both these situations, the ticket is considered to be valid, and the redeeming process can proceed. However, if there are values in the repository record and the values differ from the values supplied by the device in the downloadURL, it means that a content theft attempt is being made and a security alert is generated.

If the validation of the ticket is successful, that is, the ticket is a generic ticket with originally blank parameter values, or is a device specific ticket with values that match the values supplied by the delivery agent, the content server obtains the content from the content database and encrypts it for the particular playback device (315), using the unique playback device ID as described in the U.S. patent application Ser. No. 09/894,846. Finally, the encrypted content is transmitted to the delivery agent for the playback device through HTTP over the network (320).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of implementations of invention have been described. Nevertheless, it will be understood that modifications can be made without departing from spirit and scope of invention. For example, the steps can be carried out in a different order than what was described above. Only one system for delivering audio files to a particular device has been described, but the invention is equally applicable to any system in which audio files can be targeted for a particular device. The invention has been described above for audio files in particular, but is also applicable to other types of media files, such as video files, and corresponding media playback devices for playing back files of this type. Optionally, the content server can verify that the playback device for which the ticket has been issued is registered with the user's account at the service provider site. The content server can use a counter for the number of successful downloads. If the numbers of successful downloads is less than one, the ticket has not been redeemed yet, and if the successful download counter is equal to one or higher, someone is trying to violate the system by downloading the same content more than one time. Accordingly, other implementations are within the scope of the following claims.

What is claimed is:

1. A method for generating a ticket representing a selection of media files to be transferred from a content server to a playback device, comprising:

receiving a selection of one or more media files to be transferred to a particular playback device;

receiving device identifying information for the particular playback device; and generating a ticket based on the device identifying information, wherein the ticket is redeemable for the one or more selected media files and the media files are formatted so that they can only be rendered on the particular playback device.

2. The method of claim 1, further comprising transferring the ticket to a delivery agent that is operable to communicate with the particular playback device.

3. The method of claim 2, wherein the delivery agent resides in the particular playback device.

4. The method of claim 2, wherein the delivery agent resides on hardware platform and the particular playback device is intermittently connected to the hardware platform.

5. The method of claim 1, wherein the device identifying information is obtained from a removable nonvolatile storage medium in the particular playback device.

6. The method of claim 1, wherein the device identifying information comprises a unique identification string obtained from the particular playback device.

7. The method of claim 6, wherein the unique identification string is a serial number.

8. The method of claim 1, wherein the device identifying information comprises a dynamically generated identification string.

9. The method of claim 8, wherein the string is generated by a secure number generator in the particular playback device.

10. The method of claim 1, wherein generating a ticket comprises storing a transaction identification number as a key to a record containing identifiers for the one or more selected media files.

11. The method of claim 10, wherein generating a ticket further comprises generating a secure hash of the transaction identification number.

12. The method of claim 1, wherein generating a ticket comprises generating a ticket representing a downloadURL to the content server, the downloadURL including device identifying information.

13. A method for redeeming a ticket representing a selection of media files to be transferred from a content server to a playback device, comprising:

receiving a ticket redeemable for one or more media files, the ticket including device identifying information for a particular playback device to which the media files are to be transferred;

receiving device identifying information from the particular playback device to which the media files are to be transferred;

validating the ticket using the device identifying information included in the ticket and the device identifying information from the particular playback device;

formatting the one or more selected media files for the particular playback device if the ticket is valid; and transferring the one or more formatted media files from the content server to the particular playback device.

14. The method of claim 13, further comprising:

creating a content license for the one or more selected media files, the content license containing information about what operations can be performed on the one or more media files after the one or more media files have been transferred to the particular playback device; and transferring the content license from the content server to the particular playback device.

15. The method of claim 13, wherein transferring the one or more formatted media files comprises transferring the one or more formatted media files to a delivery agent that is operable to communicate with the particular playback device.

16. The method of claim 15, wherein the delivery agent resides in the particular playback device.

17. The method of claim 15, wherein the delivery agent resides on hardware platform and the particular playback device is intermittently connected to the hardware platform.

18. The method of claim 13, wherein the ticket includes a transaction identification number and validating the ticket comprises verifying that a transaction identification number corresponding to the transaction identification number contained in the ticket exists on the content server.

19. The method of claim 13, wherein the ticket includes a downloadURL with a secure hash value representing the transaction identification number and validating ticket comprises:

generating a secure hash value for the transaction identification number; and comparing the secure hash with the secure hash included in the ticket.

20. The method of claim 13, wherein validating the ticket comprises determining if the one or more media files already have been successfully retrieved.

21. The method of claim 13, wherein validating the ticket comprises verifying that the particular playback device associated with the ticket also is associated with a user account at a service provider site from which the ticket was issued.

22. The method of claim 13, wherein the ticket comprises a URL for downloading the selection of media files from the content server.

23. A content server for generating a ticket representing a selection of media files to be transferred from a content server to a playback device, comprising:

means for receiving a selection of one or more media files to be transferred to a particular playback device;

means for receiving device identifying information for the particular playback device; and means for generating a ticket based on the device identifying information, wherein the ticket is redeemable for the one or more selected media files and the media files are formatted so that they can only be rendered on the particular playback device.

24. The content server of claim 23, wherein the ticket comprises a URL for downloading the selection of media files from the content server.

25. A content server for redeeming a ticket representing a selection of media files to be transferred from a content server to a playback device, comprising:

means for receiving a ticket redeemable for one or more media files the ticket including device identifying information for a particular playback device to which the media files are to be transferred;

means for receiving device identifying information from the particular playback device to which the media files are to be transferred;

means for validating the ticket using the device identifying information included in the ticket and the device identifying information from the particular playback device;

means for formatting the one or more selected media files for the particular playback device if the ticket is valid; and means for transferring the one or more formatted media files from the content server to the particular playback device.

26. The method of claim 25, wherein the ticket comprises a URL for downloading the selection of media files from the content server.

* * * * *